Figure 1:
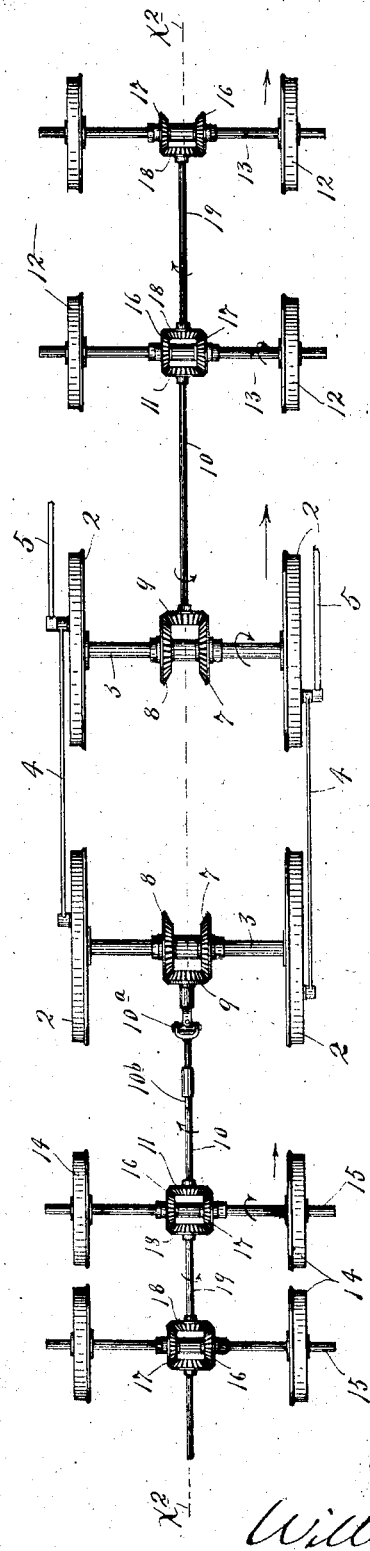

No. 839,140. PATENTED DEC. 25, 1906.
W. HANSMANN.
TRACTION DRIVE FOR LOCOMOTIVES.
APPLICATION FILED MAR. 14, 1906.

2 SHEETS—SHEET 1.

Witnesses.
A. H. Opsahl.
E. W. Jeppesen.

Inventor.
Wilhelm Hansmann
By his Attorneys.
Williamson Merchant

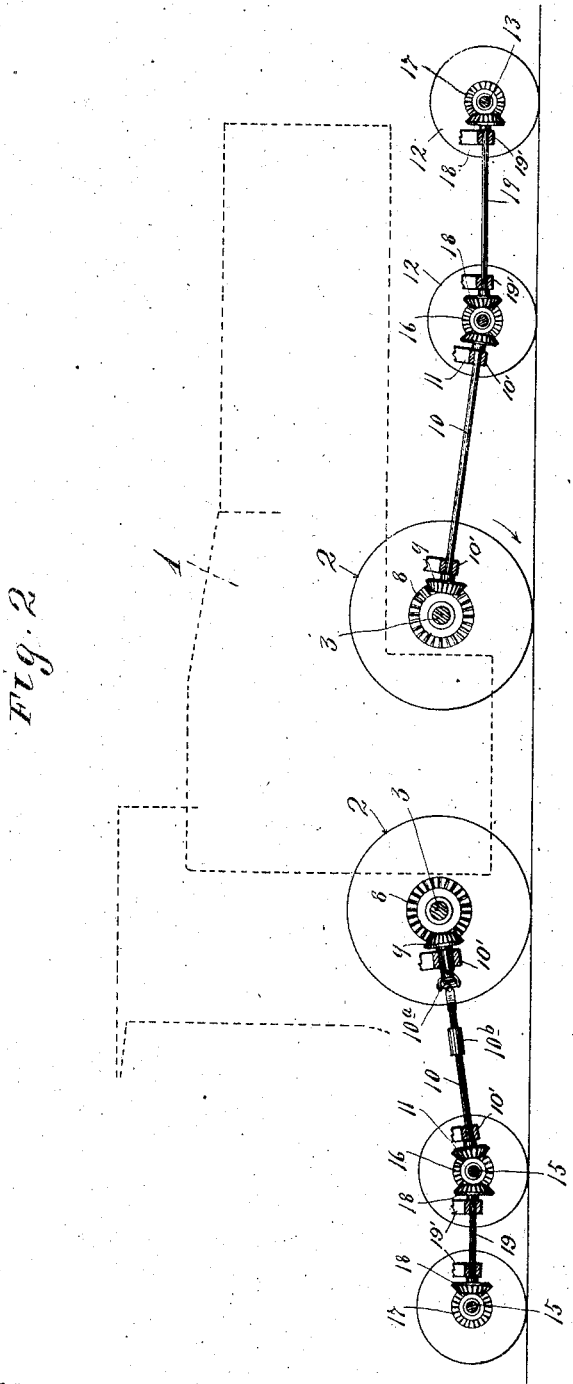

UNITED STATES PATENT OFFICE.

WILHELM HANSMANN, OF LASTRUP, MINNESOTA.

TRACTION-DRIVE FOR LOCOMOTIVES.

No. 839,140.　　　Specification of Letters Patent.　　Patented Dec. 25, 1906.

Application filed March 14, 1906. Serial No. 306,045.

*To all whom it may concern:*

Be it known that I, WILHELM HANSMANN, a citizen of the United States, residing at Lastrup, in the county of Morrison and State of Minnesota, have invented certain new and useful Improvements in Traction-Drives for Locomotives; and I do hereby declare the following to be a full, clear, and exact description of the invention, such as will enable others skilled in the art to which it appertains to make and use the same.

My invention has for its object to provide an improved traction driving-gear for locomotives; and to the above ends the invention consists of the novel devices and combinations of devices hereinafter described, and defined in the claim.

Broadly stated, the invention consists in the provision of driving mechanism whereby not only the usual drive-wheels of the engine, but the wheels of the forward truck and the tender or some thereof, will be converted into traction-wheels, and all of said wheels will be driven at the same peripheral speed.

The invention is illustrated in the accompanying drawings, wherein like characters indicate like parts throughout both views.

Referring to the drawings, Figure 1 is a plan view of the improved driving-gear with the body of the locomotive removed and with some parts removed and others broken away; and Fig. 2 is a vertical longitudinal section taken approximately on the line $x^2$ $x^2$ of Fig. 1, the body of the locomotive being indicated in part by dotted lines.

The numeral 1 indicates the body of the locomotive.

The numeral 2 indicates the usual drive-wheels that are secured on the axles 3, mounted in the usual way in bearings on the frame (not shown) of the locomotive. These drive-wheels 2 are connected in the customary way by links 4 and receive motion in the usual way through crank-rods 5. On the intermediate portion of each axle 3 is a rigidly-secured bevel-gear 7 and a loose bevel-gear 8. Each pair of gears 7 8 mesh with a bevel-pinion 9 on the adjacent ends of shafts 10, which shafts extend in opposite directions and are provided at their other ends with bevel-gears 11.

The numeral 12 indicates the wheels of the forward truck, which wheels are secured to axles 13.

The numeral 14 indicates wheels of the tender, which wheels are secured on axles 15. On each of the axles 15 and 13 is a rigidly-secured bevel-gear 16 and a loose bevel-gear 17. The gears 11 mesh with the gears 16 and 17 of the axles 13 and 15 that are nearest to the driving-axles 3. The gears 16 and 17 also mesh with bevel-gears 18, that are connected in pairs by shafts 19.

The shafts 10 and 19 are mounted in suitable bearings 10' and 19', as shown in Fig. 2. Said bearings may be secured to the engine and tender; but in the drawings the upper portion of said bearings are broken away.

The bearings for the shafts 10-19 are not shown in the drawings, but may be of any suitable form and may be attached to the locomotive-frame in any suitable way. The shaft 10, which transmits motion from the rear driving-axle 3 to the axles of the tender, is provided with a knuckle-joint $10^a$ and a longitudinal extensible section $10^b$, that is made up of telescoping angular sections, thereby adapting the said shaft to compensate for movements of the tender with respect to the locomotive proper.

When the locomotive is moved forward, the different wheels, axles, gears, and shafts will be rotated in the directions of the arrows marked thereon in Fig. 1. The loose gears 8 and 17 are not necessary, but are thought to be desirable. The relative size of the several driving gears and pinions are such that all of the traction-wheels 2, 12, and 14 will be driven at the same peripheral speed, and hence will all assist in the driving action. As is evident by this arrangement, the entire weight of the engine and tender on the several wheels produce a traction force which may be utilized in drawing heavy loads by the locomotive. In this way therefore a locomotive is provided which for a given weight will be capable of drawing the greatest possible load. This driving-gear may be used on traction-engines and road-trains.

If desired, a second knuckle-joint $10^a$ may be used to couple the shaft 10 to its gear 11.

What I claim is—

In a locomotive, the combination with the main drive-wheels 2 and their axles 3, the usual connecting-links 4 and driving-rods 5 thereto, of forward truck-wheels 12 and their axles 13, tender-wheels 14 and their axles 15, driving-gears 7-16 loose gears 8 and 17 and connecting-shafts 10-19 coupling the axles 13 of said forward truck and of said tender to the axles 3 of the main drive-wheels 2, and arranged to cause all of said wheels to act as traction-wheels, and to rotate at the same peripheral speed, the shaft connection 10 between the tender-wheel axles 15 and the rear main wheel-axle 3, involving a knuckle-joint $10^a$ and a longitudinally-adjustable shaft-section $10^b$, substantially as described.

In testimony whereof I affix my signature in presence of two witnesses.

WILHELM HANSMANN.

Witnesses:
J. F. BRINKMANN,
JOHN FISCHER.